United States Patent Office 3,548,028
Patented Dec. 15, 1970

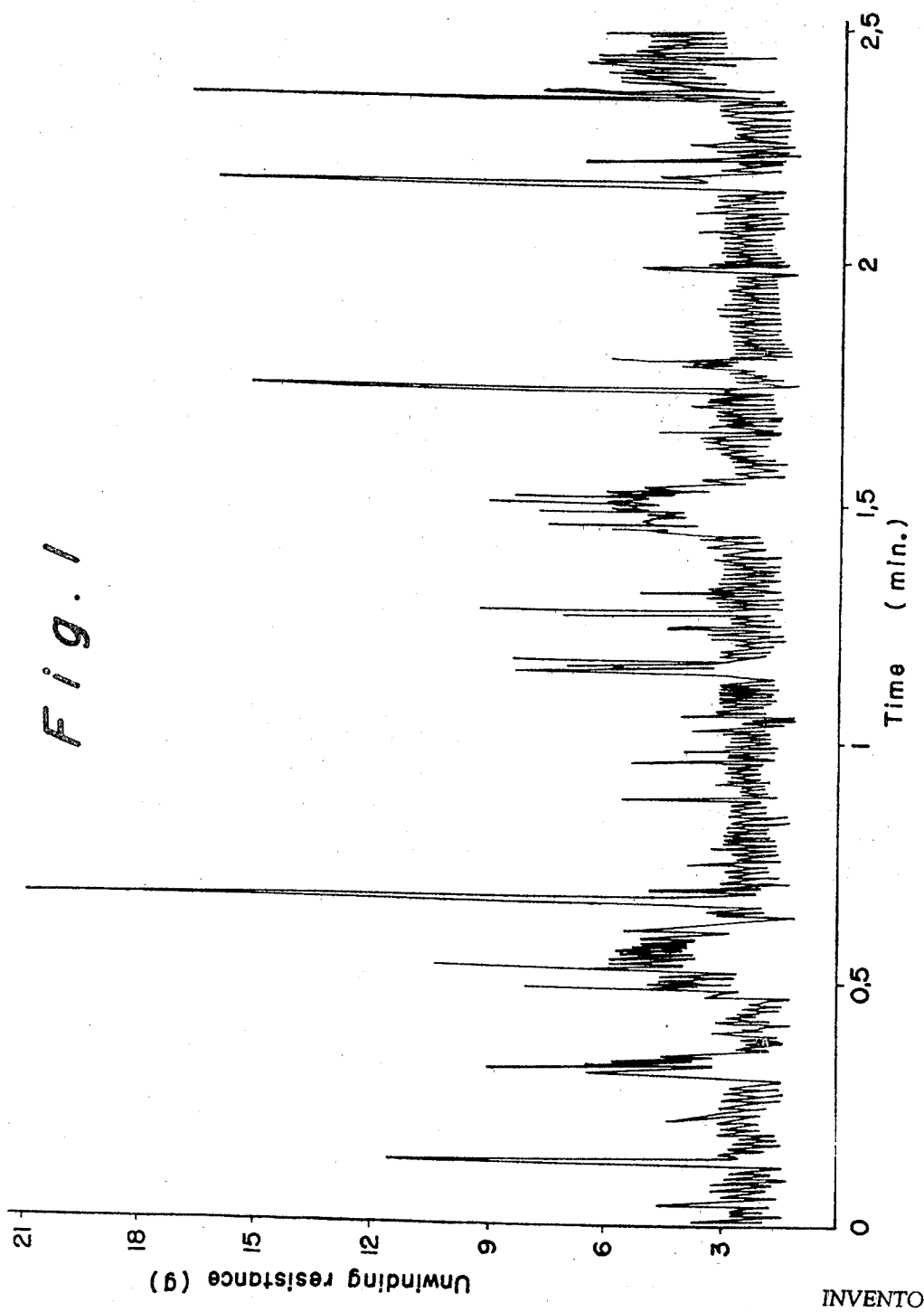

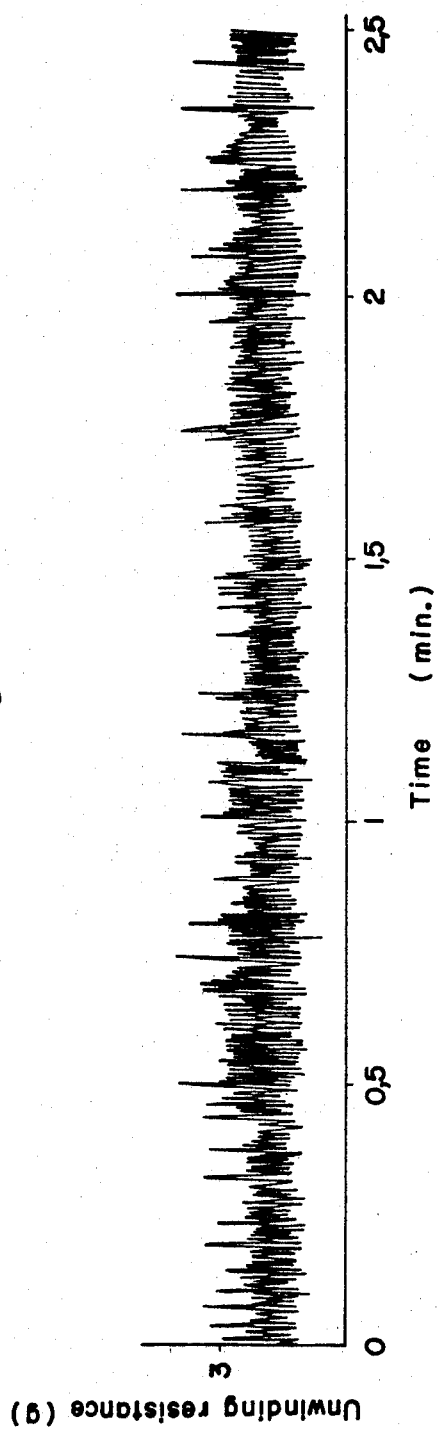

3,548,028
METHOD OF PRODUCING NON-STICKY FILA-MENTARY MATERIAL CONSISTING OF CO-POLYAMIDE AND POLYOLEFIN
Yoshio Itabashi and Masao Sekii, Hofu, Japan, assignors to Kanegafuchi Boseki Kabushiki Kaisha and Snia Viscosa Societá Nazionale Industria Applicazioni Viscosa S.p.A., Tokyo, Japan, and Milan, Italy
Filed Feb. 2, 1968, Ser. No. 702,743
Claims priority, application Japan, Feb. 9, 1967, 42/8,394
Int. Cl. C08g 41/04
U.S. Cl. 260—857          13 Claims

ABSTRACT OF THE DISCLOSURE

Non-sticky filamentary material consisting of copolyamide is prepared by dissolving polyolefin or copolyolefin in an organic solvent inert to the comonomer of said copolyamide and also said copolyamide and having a boiling point lower than the melt copolymerization temperature of said copolyamide, adding the resulting solution to the copolymerization reaction system before the completion of said copolymerization and carrying out said melt copolymerization in the presence of said solution to remove said solvent and melt extruding the thus copolymerized copolyamide.

---

The present invention relates to a method of producing non-sticky filamentary material consisting or containing copolyamide.

The polyamide fibers have been heretofore used in a wide field owing to the excellent properties, but most of these fibers have been formed from homopolyamides and there have been some properties to be improved, for example, in dyeability, hydroscopicity, elastic recovering property, etc. In order to improve these properties a large number of copolyamides copolymerized two or more polyamide forming materials have been proposed.

Although most of these copolyamide fibers have generally excellent properties in dyeability, hygroscopicity, elastic recovering property, etc. as compared with homopolyamide fibers, the copolyamide fibers have not been commercially manufactured due to the stickiness inherent to the copolyamide fibers.

When the copolyamides are melt spun and formed filaments are then treated with an oiling agent and whereafter taken up on a bobbin, the fibers stick with each other, so that, in the subsequent processes such as drawing, the unwinding of the yarn from a bobbin is not smoothly performed and a uniform treatment cannot be effected and moreover the yarn is broken and the operability is considerably decreased.

Furthermore, when a conjugate filament, particularly, a side-by-side type conjugate filament having a latent crimpability, in which two or more components are arranged in a side-by-side relation in the cross section of a unitary filament, is produced, it is necessary to use polymers having similar property as these components in order to prevent separation of components after spinning, so that in general, a copolyamide has been used in combination with a homopolyamide.

In order to make the crystal structures of the polymer components in such a conjugate filament different as far as possible and to increase the difference in shrinkability between those components, that is, to increase the latent crimpability of the filament, it is preferable to increase a copolymerization ratio of the copolyamide. The term "copolymerization ratio" used herein means mole ratio of the minor comonomer constituting the copolyamide based on the total comonomers. However, the stickiness phenomenon is increased as the copolymerization ratio increases, so that it has been heretofore difficult to prepare a side-by-side type polyamide conjugate filament having a satisfactory crimp developability.

In order to solve the above described difficulties, a method for producing copolyamide filament having the same excellent properties as those of polyamide filament and exhibiting no stickiness, which comprises incorporating polyolefin or copolyolefin to the copolyamide homogeneously and melt-spinning the copolyamide containing said polyolefin or copolyolefin into filaments, has been hitherto proposed in the U.S. patent application Ser. No. 600,948, now abandoned.

In the proposed method, powders or fine particulates of polyolefin or of copolyolefin are added to the copolyamide or monomers therefor. However, the powders or fine particulates have difficulties in view of transportation, weighing, mixing and charging into a reactor, and further it is difficult to disperse the polyolefin or copolyolefin into the copolyamide homogeneously, and therefore it is necessary to use an auxiliary means, for example, forced stirring and mixing or bubbling with an inert gas. Particularly, in a continuous polymerization process, the starting materials for the copolyamide are charged from the top of a continuous polymerization reaction tower continuously and quantitatively, and it is most desirable that various additives are previously dissolved homogeneously, or mixed in a stable dispersed state in the starting materials, but the polyolefin or copolyolefin cannot be incorporated or dispersed homogeneously in solution or melt of the starting materials and therefore, it is necessary to charge the polyolefin or copolyolefin and the starting materials individually separately. However, it is extremely difficult to charge the powders or fine particulates continuously, quantitatively and homogeneously into the reaction tower. Furthermore, when the aqueous emulsion is applied, not only said emulsion is unstable due to a high temperature in the vicinity of the reaction tower, but also the transportation, weighing, mixing and particularly feeding into the tower are difficult and moreover the homogeneous dispersion of the additives into the copolyamide is difficult.

The above difficulties are caused by the fact that the polyolefin or copolyolefin cannot be dissolved in the copolyamide-forming materials.

The inventors have solved the above described problems by dissolving the polyolefin or copolyolefin homogeneously in an inert solvent which does not affect the copolymerization reaction system, and whereby transporting, weighing and charging into the polymerization of the resulting solution are facilitated.

The object of the present invention is to provide filaments consisting of copolyamide which exhibit no stickiness without deteriorating the other excellent properties.

A further object is to provide a method of producing a non-sticky practical fiber from such a copolyamide having a high copolymerization ratio that a practical fiber has not been able to be obtained from due to a high stickiness.

The other object is to provide polyamide composite filaments having no stickiness but an excellent latent crimpability, which consists of a copolyamide and a homopolyamide.

One of the most important objects of the present invention is to provide a method of producing a copolyamide which is used for the manufacture of non-sticky copolyamide filaments, which method being advantageously applied to a continuous polymerization process.

The present invention is a method of producing non-sticky filamentary material consisting of a copolyamide obtained by melt copolymerizing the comonomers for said copolyamide and by melt extruding the thus copolymerized copolyamide, comprising the steps of (a)

dissolving an olefin polymeric compound into an organic solvent inert to said comonomers and said copolyamide and having a boiling point temperature, at the melt copolymerization conditions, lower than the said melt copolymerization temperature; (b) adding the resulting solution to the copolymerization reaction system before the completion of said copolymerization and carrying on said melt copolymerization in the presence of said solution; and (c) removing said solvent before melt extruding the copolymerized copolyamide.

The polyolefin or the copolyolefin dispersed in the above described method retains a homogeneously and satisfactorily dispersed state in the melted copolyamide for a long time, so that both the components do not separate under a conventional melt spinning condition.

According to the above described method, said polyolefin or said copolyolefin can be continuously and satisfactorily quantitatively added to the reaction system in a batch polymerization process and also in a continuous polymerization process, and further the polyolefin or the copolyolefin can be readily dispersed extremely homogeneously in a short time due to the presence of said solvent. Furthermore, substantially the whole amount of the solvent employed can be recovered and the recovered solvent can be reused.

Specifically, in the continuous polymerization, it is necessary to charge the polyolefin or copolyolefin into the continuous polymerization reaction tower continuously with feeding rate strictly proportionately to that of the starting materials for the copolyamide. Such a purpose is accomplished by charging individually liquidized starting materials for the copolyamide and the solution of the polyolefin or copolyolefin into the reaction tower through respective metering pumps, which are coupled to cooperate so as to measure and transport said liquid(s) and the solution in a desired ratio. According to this process the starting materials for the copolyamide and the polyolefin or copolyolefin are charged into the polymerization reaction tower continuously and quantitatively.

The concentration of the solution of the polyolefin or the copolyolefin in a solvent is not particularly limited in the practice of the method of the present invention, while said concentration is preferably from 1% to 20% by weight, more preferably 5–15%, and more particularly 8–12%.

When said concentration is less than 1% by weight, it needs a long time to obtain a homogeneous dispersion, while in the case of more than 20% by weight, solution is liable to cause gelation.

Suitable solvents for the method of the present invention include organic solvents having such a lower boiling point temperature, at the melt copolymerization conditions, than the melt polymerization temperature, that said solvent can be easily evaporated at the melt polymerization temperature after added thereto, out of a solution of the polyolefin or the copolyolefin, and preferably solvents having a boiling point which is at least 20° C. lower than the melt polymerization temperature, at the melt polymerization conditions, for example, benzene, toluene, xylene, solvent naphtha, cyclohexane, petroleum ether, n-heptane or derivatives thereof, such as, the alcoholic derivatives and halogenated derivatives.

Among them, toluene and xylene are most preferable.

The term "copolyamides" used herein mean fiber-forming polyamides obtained by copolycondensing two or more polyamide forming components selected from the group consisting of lactams, ε-amino carboxylic acid and salts of diamines and dicarboxylic acids, for example, the polyamide forming compounds such as, γ-butyrolactam, δ-valerolactam, ε-caprolactam, heptalactam, 6-aminocaproic acid, 7-aminoheptanoic acid, 9-aminononanoic acid, 11-aminoundecanoic acid or salts of diamines, such as, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, metaxylylenediamine, paraxylylenediamine, bis(γ - aminopropyl)ether, N,N'-bis(ω-aminopropyl)piperazine, 1,11 - diaminoundecanone-6, etc. with dicarboxylic acids, such as, terephthalic acid, isophthalic acid, glutaric acid, adipic acid, pimelic acid, suberic acid, azelaic acid, sebacic acid, dodecandicarboxylic acid, hexahydroterephthalic acid, diphenylene-4,4'-dicarboxylic acid, diphenylmethane-4,4'-dicarboxylic acid, diphenylether-4,4'-dicarboxylic acid, diphenylpropane-4,4'-dicarboxylic acid, etc. or salts of diamines and dicarboxylic acid derivatives or salts of diamine derivatives and dicarboxylic acids.

Furthermore, inorganic or organic substances, such as delustering agents, pigments, dyestuffs, light stabilizers, heat stabilizers, antistatic agents, plasticizers, etc. may be added, if required.

Polyolefins to be applied to the present invention include high polymers obtained from a monomer having the following general formula:

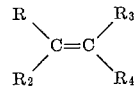

wherein $R_1$, $R_2$ and $R_3$ are hydrogen or methyl group, and $R_4$ is hydrogen, an alkyl group or an alkenyl group having less than 6 carbon atoms or an aryl group. As said olefin monomers, mention may be of mono olefins, such as, ethylene, propylene, 1-butene, 2-butene, isobutene, 1-pentene, 2-pentene, 2-methyl-1-butene, 3-methyl-1-butene, 2-methyl - 2-butene, 1-hexene, 2-hexene, 4-methyl-1-pentene, 2,3-dimethyl-2-butene, etc. and diolefins, such as, butadiene, isoprene, 1,3-pentadiene, 1,4-pentadiene, etc. As said polyolefins, mention may be made of polyethylene, polypropylene, polybutene-1, polypentene-1, poly-3-methylbutene-1, poly - 4-methylpentene-1, polystyrene, poly-O-methylstyrene, etc. Among them, polyethylene and polypropylene are most preferable.

Furthermore, copolyolefins obtained from an olefin monomer and a monoethylenically unsaturated monomer different from said olefin monomer can be used.

Such an olefin monomer is the above described olefin or diolefin, and said monoethylenically unsaturated monomer is represented by the following general formula:

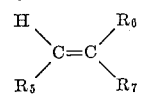

wherein $R_5$ is hydrogen, a carboxyl group or an esterified carboxyl group, $R_6$ is hydrogen, a halogen, an alkyl group, a cyano group or a carboxymethyl group, $R_7$ is a halogen, a cyano group, a carboxyl group, an esterified carboxyl group, a carboalkoxy group, an acyloxy group, a cycloalkyl group, an aryl group, a haloaryl group, a haloalkyl group, aldehyde, amide, imide or ether. The particularly suitable monomers include α,β-ethylenically unsaturated carboxylic acids, for example, acrylic acid, methacrylic acid, ethacrylic acid, itaconitic acid, maleic acid, fumaric acid, aconitic acid, citraconic acid, mesaconic acid; esters, amides, nitriles of said carboxylic acids, particularly, methyl acrylate, ethyl acrylate, butyl acrylate, methyl methacrylate, methoxymethyl methacrylate, butyl methacrylate, chloroethyl methacrylate, dimethyl itaconate, diethyl citraconate, diethyl mesaconate, monomethyl maleate, monomethyl fumarate, monoethyl fumarate, maleic anhydride, acrylonitrile, methacrylonitrile, acrylamide, methacrylamide. The other important monomers include halogenated vinyl monomers having the general formula $CH_2=CHX$, wherein X is a halogen, preferably, chlorine or fluorine; halogenated vinylidene monomers having the general formula $CH_2=CX_2$, wherein X is a halogen, preferably chlorine or fluorine; vinyl carboxylate such as vinyl formate, vinyl acetate, vinyl chloroacetate, vinyl butyrate, vinyl propionate, vinyl laurate, vinyl stearate; unsaturated aldehydes or ketones, such as, acrolein, methacrolein, methyl vinyl ketone; unsaturated ethers such as vinyl ethyl ether, vinyl isobutyl ether, vinyl-β-hydroxyethyl ether; aryl vinyls such as vinyl toluene, vinyl xylene, vinyl naphthalene, α-methyl styrene or α-methyl vinyl toluene.

Moreover, as preferable copolyolefin to be applied to the method of the present invention, mention may be made of the following copolymers: ethylene/acrylic acid copolymer, ethylene/methacrylic acid copolymer, ethylene/itaconic acid copolymer, ethylene/monomethyl maleate copolymer, ethylene/maleic acid copolymer, ethylene/styrene/acrylic acid copolymer, ethylene/acrylic acid/methyl methacrylate copolymer, ethylene/methacrylic acid/ethyl acrylate copolymer, ethylene/itaconic acid/methyl methacrylate copolymer, ethylene/monomethyl maleate/ethyl acrylate copolymer, ethylene/vinyl acetate copolymer, ethylene/methacrylic acid/vinyl acetate copolymer, ethylene/acrylic acid/vinyl alcohol copolymer, ethylene/propylene/acrylic acid copolymer, ethylene/styrene/acrylic acid copolymer, ethylene/methacrylic acid/acrylonitrile copolymer, ethylene/fumaric acid/vinylmethyl ether copolymer, ethylene/vinyl chloride/acrylic acid copolymer, ethylene/vinylidene chloride/acrylic acid copolymer, ethylene/vinyl fluoride/methacrylic acid copolymer, ethylene/chlorotrifluoroethylene/methacrylic acid copolymer, isobutylene/vinyl cyanide copolymer, isobutylene/vinylidene cyanide copolymer, ethylene/styrene copolymer, ethylene/acrylonitrile copolymer, propylene/acrylonitrile copolymer, polyethylene/acrylic acid graft copolymer, polyethylene/methacrylic acid graft copolymer, ethylene/propylene copolymer/acrylic acid graft copolymer, ethylene/butene-1 copolymer/methacrylic acid graft copolymer, ethylene/vinyl acetate copolymer/methacrylic acid graft copolymer, polypropylene/acrylic acid graft copolymer, polypropylene/methacrylic acid graft copolymer, polybutene/acrylic acid graft copolymer, poly-3-methyl-butene/acrylic acid graft copolymer, polyethylene/acrylic acid/ethyl acrylate graft copolymer, etc. Among them, ethylene/acrylic acid copolymer, ethylene/methacrylic acid copolymer and ethylene/vinyl acetate copolymer are most preferable.

The content of the olefin monomer in the copolyolefin is preferably at least 15 mol percent, and the content of the monoethylenically unsaturated monomer is at most 85 mol percent.

The copolyolefins are not always composed of two comonomers but the number of comoners is not limited, in so far as the effect of the present invention is obtained.

The amount of the polyolefin or the copolyolefin added to the copolyamide, which is required to attain the object of the present invention is preferably within a range from 0.01 to 1.0% by weight based on the copolyamide, most preferably a range of 0.05 to 0.5% by weight.

When said amount is less than 0.01% by weight, the effect for eliminating the sticking properties of the copolyamide is insufficient and in the case of more than 1.0% by weight the desirable properties inherent to the copolyamide are modified or badly affected.

However, it is preferable that the amount of the polyolefin or the copolyolefin added is selected depending upon the composition of the copolyamides. Thus, in general, the higher copolymerization ratio a copolyamide has, the lower melting point and the more increased stickiness it shows, so that when the copolymerization ratio of the copolyamide is low, the amount of the polyolefin or the copolyolefin added may be small, while as the copolymerization ratio increases, it is necessary to increase the added amount.

According to the present invention the polyolefin or copolyolefin can be added continuously and quantitatively and dispense satisfactorily in a short time in the starting materials for copolyamide or the polymerizing copolyamide, because said polyolefin or copolyolefin is added as a solution. Thus, in preparing the copolyamide for fiber production, the copolymerization ratio is readily increased to such an extent that heretofore it has never been attained due to the stickiness of the objected filament and the non-sticky copolyamide fiber having considerably high heat shrinkability can be easily obtained.

Furthermore, within the above range of the amount of the polyolefin or the copolyolefin added, the strength, elongation, dyeability, hygroscopicity, elastic recovering property and the other desired properties of the polyamide fibers are not substantially deteriorated.

Moreover, the conjugate filaments obtained by melting the copolyamide containing the polyolefin or the copolyolefin according to the invention and a well-known homopolyamide separately and by extruding them simultaneously through a common orifice is excellent in the mutual bonding property of the two polymers and further said copolyamide does not show any stickiness, and the latent crimpability is increased due to the high heat shrinkability, so that the fiber having extremely excellent crimps and bulkiness can be obtained by a heat treatment.

The copolyamide fibers melt spun according to the invention can be treated uniformly and easily in oiling, taking up and drawing processes and in the succeeding knitting and weaving processes without accompanying any disadvantage, such as, unsatisfactory unwinding from a bobbin or mutual stickiness between fibers, as in a conventional homopolyamide fiber and furthermore the treating velocity can be further increased.

The fibers obtained by the invention are provided with the excellent properties as described above which have never been seen in conventional homopolyamide fibers, so that they are preferable as raw material for producing various clothings, interior ornaments, commercial articles, etc. by using solely or in combination with the other fibers. Particularly, if the high shrinkability is utilized and said fibers are mix-spun or mix-woven with the other fibers and then subjected to a heat treatment, interesting fancy yarns or fancy fabrics can be manufactured.

For a better understanding of the invention, reference is made to the accompanying drawings, wherein:

FIG. 1 is a graph showing an unwinding resistance of a well-known undrawn copolyamide yarn in unwinding it from a bobbin; and FIG. 2 is a graph showing an unwinding resistance of the undrawn copolyamide yarn improved by the method according to the invention in unwinding it from a bobbin.

The invention will be explained further in detail by the following examples which are not intended as limitations thereof, and with "parts" means "parts by weight."

EXAMPLE 1

(A) a mixture of 100 parts of melted ε-caprolactam with 0.22 part of acetic acid maintained at 90° C., (B) 50% aqueous solution of salt of adipic acid with hexamethylenediamine and (C) 10% (by weight) solution of ethylene/vinyl acetate (93.4 mol/6.6 mol) copolymer in xylene were charged continuously and individually into the top of polymerization reaction tower by means of cooperating three metering pumps respectively in a weight ratio of $A:B:C$ being 85:30:5. The xylene was recovered from the top of said reactor together with water vapour.

The maximum temperature in the reaction tower was 255° C. The charged monomers were polycondensed into the copolyamide, while they proceeded downwards, until the copolyamide was extruded from the bottom of the reaction tower through a spinnert by means of a metering pump to form filament. The time required for the monomers to travel through the reaction tower was 20 hours. The extruded filaments were treated with an aqueous emulsion of an oiling agent and then the resulting yarn was taken up on a bobbin as an undrawn yarn of 2000 deniers/40 filaments.

On the other hand, a copolyamide not containing the ethylene/vinyl acetate copolymer was extruded and yarn was produced under the same conditions as described above, which was a control yarn.

The stickiness of the undrawn yarn was measured as follows.

The bobbin was placed on a floor vertically and at a position spaced 60 cm. above said bobbin on the extended line of the central axis of the bobbin, a guide was fixed and at a position spaced 13 cm. from said guide horizontally, another guide was fixed. A tension meter was provided at a middle position between both the guides. The variation of tension applied on the yarn, when the undrawn yarn was unwound from the bobbin at a take-up velocity of 130 m./min., was detected and recorded on a chart by means of a pen writing recorder. The determined results are shown in FIGS. 1 and 2 respectively.

FIG. 1 is a graph showing an unwinding resistance of the control yarn containing no ethylene/vinyl acetate copolymer. The variation of the unwinding resistance is extremely large and its maximum value is 20.7 g.

On the other hand, FIG. 2 shows a variation of an unwinding resistance of the undrawn yarn containing ethylene/vinyl acetate copolymer according to the present invention and the variation of the unwinding resistance is small and the maximum value is 3.9 g.

The fact that an unevenness of the unwinding resistance is small, is of great significance in a subsequent cold drawing step in view of the quality and operability, that is, in the control yarn the yarn breakage often occurred, so that the operation was difficult, while in the yarn according to the invention the cold drawing operation could be smoothly effected.

The xylene recovered from the top of the reactor was separated and purified from the other components by distillation and reused. The loss of the xylene was negligible.

EXAMPLE 2

(A) a mixture of 100 parts of melted ε-caprolactam with 0.2 part of acetic acid, (B) 45% aqueous solution of salt of isophthalic acid with hexamethylenediamine and (C) 10% (by weight) solution of ethylene/methyl methacrylate (90 mol/10 mol) copolymer in toluene, were charged into the top of polymerization reaction tower continuously and individually by means of cooperating three metering pumps respectively in a weight ratio of $A:B:C$ being 90:22.2:10. The toluene was recovered from the top of said reaction tower together with water vapour.

The copolyamide thus obtained was treated under the same condition as described in Example 1 and the resulting yarn was taken up on a bobbin as an undrawn yarn of 2000 deniers/40 filaments.

On the other hand, the copolyamide containing no ethylyene/methyl methacrylate copolymer was treated in the same manner as described above to obtain an undrawn yarn, which was a control yarn.

The unwinding resistances of both the yarns were measured in the same manner as described in Example 1, and as the variation of the unwinding resistance of the control yarn was considerably large and the maximum value was 25 g., while the variation of the unwinding resistance of the yarn according to the invention was slight and the maximum value was 4.0 g.

EXAMPLE 3

A mixture of 90 parts of ε-caprolactam, 10 parts of salt of isophthalic acid with hexamethylenediamine, 5 parts of purified water and 0.18 part of acetic acid was melted by heating and then introduced into an autoclave, to which was added with agitation 0.5 part of ethylene/vinyl acetate (93.4 mol/6.6 mol) copolymer as 10% solution of said copolymer in xylene. Air in the autoclave was replaced with gaseous nitrogen and the temperature was raised while passing gaseous nitrogen and stirring and then heated under atmospheric pressure at 255° C. for 8 hours, whereby the polymerization was effected. The xylene was removed off out of the system together with water vapour during said reaction and recovered through distilling and purifying step. The copolyamide thus produced was extruded through nozzles in the bottom of the autoclave by means of a metering pump into strings, which were cut into chips of 3 mmφ x 3 mm. The obtained chips were washed repeatedly with warm water at about 80° C. to remove monomer and then dried in a vacuum drier under 0.1 mm. Hg at 80° C. to a water content of 0.075% by weight. The dried chips were melt-spun by a heat-grid type of melt-spinning apparatus and the spun filaments were treated with an aqueous emulsion of an oiling agent and whereafter taken up on a bobbin as an undrawn yarn of 360 deniers/28 filaments.

Chips containing no ethylene/vinyl acetate copolymer were produced and melt-spun into an undrawn yarn of 360 deniers/2 filaments in the same manner as described above, which was a control yarn.

The unwinding resistances of the yarns were measured in the same manner as described in Example 1, and as the result the variation of the unwinding resistance of the control yarn was large and the maximum value was 13 g., while the variation of the unwinding resistance of the yarn according to the invention was slight and the maximum value was 2.1 g.

Furthermore, said copolyamide and polycaproamide were extruded in a side-by-side type in a conjugate ratio of 1:1 and the formed conjugate filaments were treated with an aqueous emulsion of an oiling agent and whereafter taken up on a bobbin as an undrawn yarn of 360 deniers/28 filaments.

The conjugate filaments comprising copolyamide containing ethylene/vinyl acetate copolymer did not at all stick to each other and said filaments were able to be cold drawn four times their original length at a drawing velocity of 500 m./min., yielding 92% perfect cop, while the conjugate filaments containing no ethylene/vinyl acetate copolymer were broken often at the drawing stage due to the stickness, yielding 40% perfect cop. The term "perfect cop" used herein means a cop formed by 1 kg. of unbroken and perfect drawn yarn. Perfect cop percentage is the percentage of the perfect cop based on one batch of cops.

Moreover, even if crimps were developed by a heat treatment, the crimps on the control yarn was insufficient and ununiform due to the stickiness between mutual monofilaments, while in the yarn according to the invention the stickiness between mutual monofilaments did not at all appear and excellent crimps were developed by a heat treatment.

EXAMPLE 4

A mixture of 90 parts of ε-caprolactam, 10 parts of salt of isophthalic acid with hexamethylenediamine, 5 parts of purified water and 0.18 part of acetic acid was heated and melted and then introduced into an autoclave and the polymerization was effected in the same manner as described in Example 3, while stirring and passing gaseous nitrogen. 4 hours after the starting of the polymerization, namely when the primary stage of the polymerization was completed and a major part of water was distilled off, 0.5 part of powdery polyethylene (made by Mitsubishi Yuka, Yukalon PS–60 type, specific gravity: 0.927) was dissolved into 4.5 parts of xylene and added thereto. Further, the polymerization was continued while stirring for 2 hours and the total amount of xylene was recovered from the reaction system during said polymerization. Then the polymerization was continued for further 2 hours and the resulting copolyamide was extruded from the bottom of the autoclave through a metering pump into a strip, which was then treated in the same manner as described in Example 3 to obtain undrawn yarn.

The unwinding resistance of the resulting yarn was measured in the same manner as described in Example 1 and the variation of said unwinding resistance was very small and the maximum value was 2.5 g.

Moreover, the conjugate filament produced by using the copolyamide containing the above described polyethylene in the same manner as described in Example 3 showed completely same excellent properties as in Example 3.

What is claimed is:

1. A method of producing non-sticky filamentary material consisting of a copolyamide obtained by melt copolymerizing the comonomers for said copolyamide and by melt extruding the thus copolymerized copolyamide, comprising the steps of:
  (a) dissolving an olefin polymeric compound in an organic solvent inert to said comonomers and said copolyamide, and having a boiling point temperature, at the melt copolymerization conditions, at least 20° C. lower than the said melt copolymerization temperature, wherein the olefin polymeric compound is either
    (i) a homopolymer based on a monomer of the formula

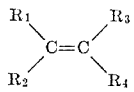

wherein $R_1$, $R_2$, and $R_3$ are each independently selected from the group consisting of hydrogen and methyl; and wherein $R_4$ is selected from the group consisting of hydrogen, alkyl of less than six carbon atoms, and aryl; or
    (ii) a copolymer based on at least 15% of the monomer under (i) and up to 85% of additional monomers;
  (b) adding the resulting solution to the copolymerization reaction system before the completion of said copolymerization and carrying on said melt copolymerization in the presence of said solution so that the percentage of the added olefin in the copolyamide is 0.01 to 1.0% based on the weight of copolyamide; and
  (c) removing said solvent before melt extruding the copolymerized copolyamide.

2. The method of claim 1, wherein said olefin compound consists of a copolyolefin obtained by copolymerizing an olefin monomer with a monoethylenically unsaturated monomer different from said olefin monomer.

3. The method of claim 1, wherein the resulting olefin-containing copolyamide is melt spun through one spinneret orifice concurrently with a melted homopolyamide.

4. The method of claim 1, wherein said copolyamide is a fiber forming polyamide obtained by copolymerizing at least two polyamide forming compounds selected from the group consisting of lactams, ω-aminocarboxylic acids and salts of diamines with dicarboxylic acids.

5. The method of claim 1, wherein said copolyamide is a copolymer of ε-caprolactam and hexamethylenediammonium isophthalate.

6. The method of claim 1, wherein said solvent is benzene, toluene, xylene, solvent naphtha cyclohexane, petroleum ether, n-heptane, alcoholic derivatives thereof or halogenated derivatives thereof.

7. The method of claim 6, wherein said solvent is toluene or xylene.

8. The method of claim 1, wherein the concentration of said olefin polymeric compound in the solution is 1 to 20% by weight.

9. The method of claim 8, wherein said concentration is 5 to 15% by weight.

10. The method of claim 8, wherein said concentration is 8 to 12%.

11. The method of claim 1, wherein said percentage is 0.05 to 0.5% by weight.

12. The method of claim 1, wherein said olefin polymeric compound is polyethylene or polypropylene.

13. The method of claim 2, wherein said copolyolefin is ethylene/acrylic acid copolymer, ethylene/methacrylic acid copolymer or ethylene/vinyl acetate copolymer.

References Cited
UNITED STATES PATENTS 3,274,289  9/1966  Murdock _____ 260—857

FOREIGN PATENTS 1,386,563  12/1964  France _____ 260—857

PAUL LIEBERMAN, Primary Examiner

U.S. Cl. X.R.

260—78; 264—176